No. 703,632. Patented July 1, 1902.
N. B. ZIMMERMAN.
CUSHIONED BICYCLE FRAME.
(Application filed Dec. 14, 1901.)
(No Model.) 2 Sheets—Sheet 1.
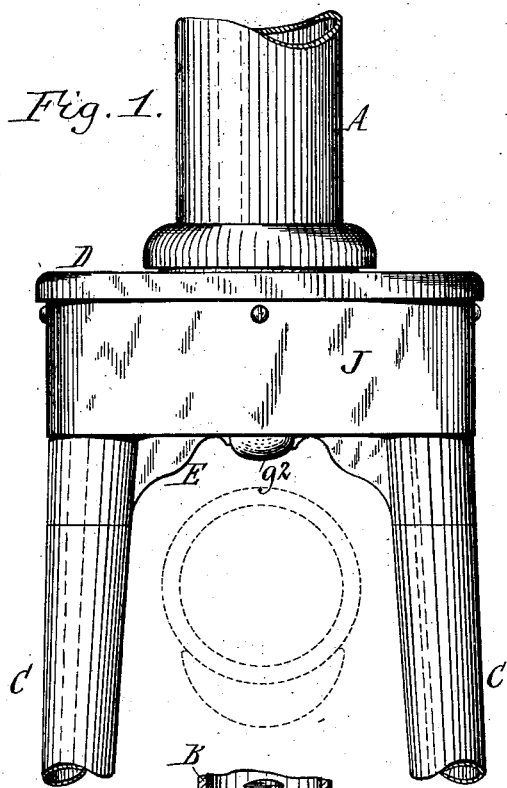
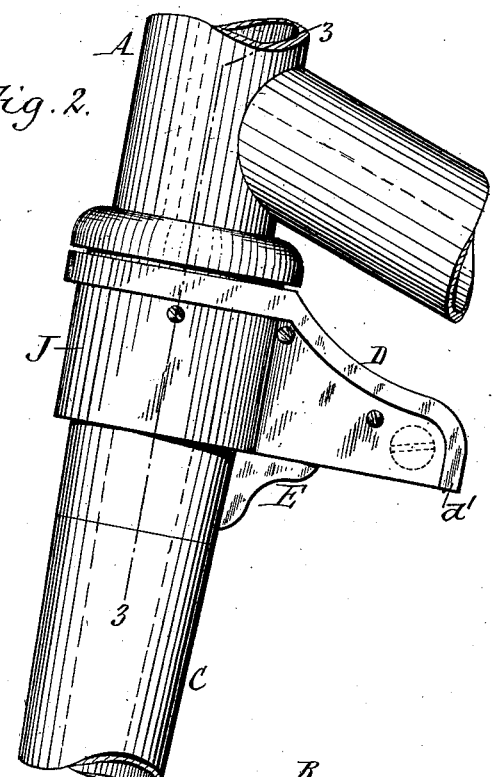
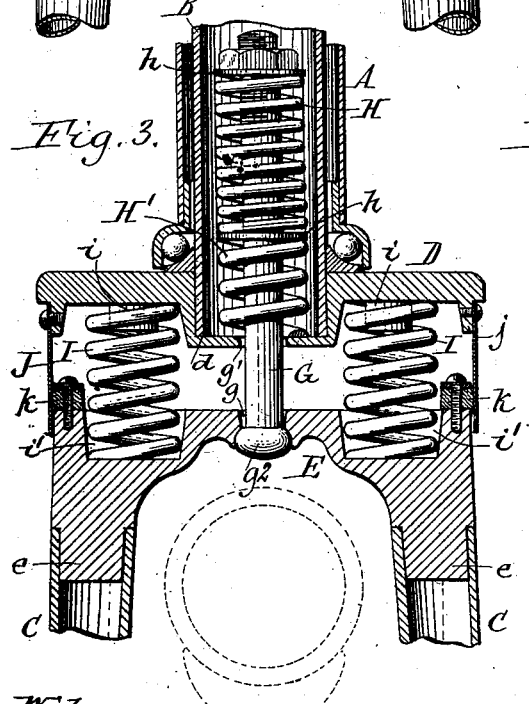
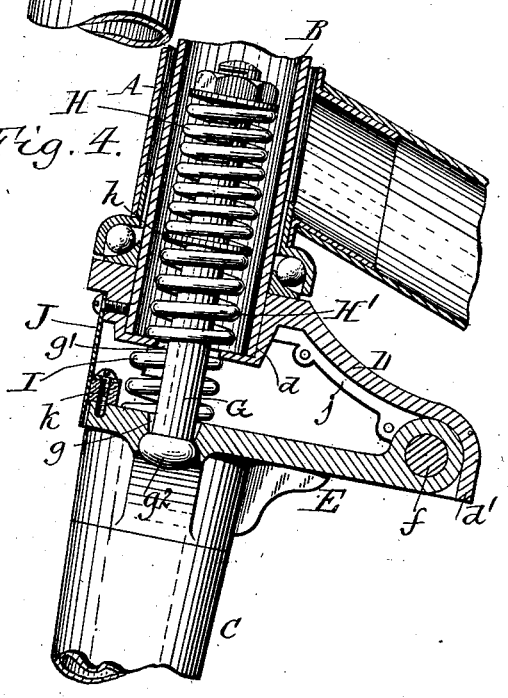
Witnesses:
Louis W. Gratz
Emma M. Graham
N. B. Zimmerman — Inventor
By Guyer & Popp
Attorneys.

No. 703,632. Patented July 1, 1902.
N. B. ZIMMERMAN.
CUSHIONED BICYCLE FRAME.
(Application filed Dec. 14, 1901.)
(No Model.) 2 Sheets—Sheet 2.
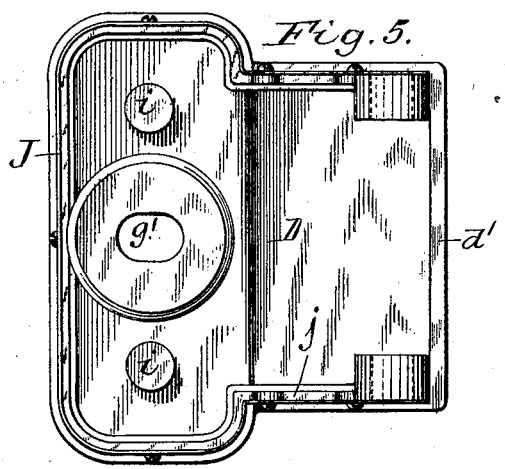
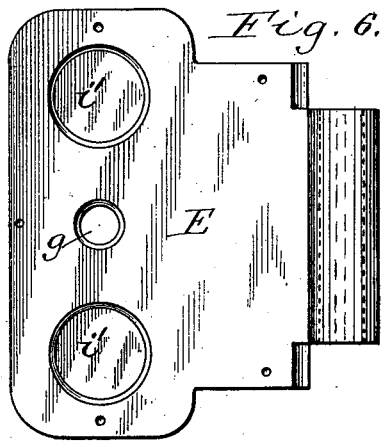
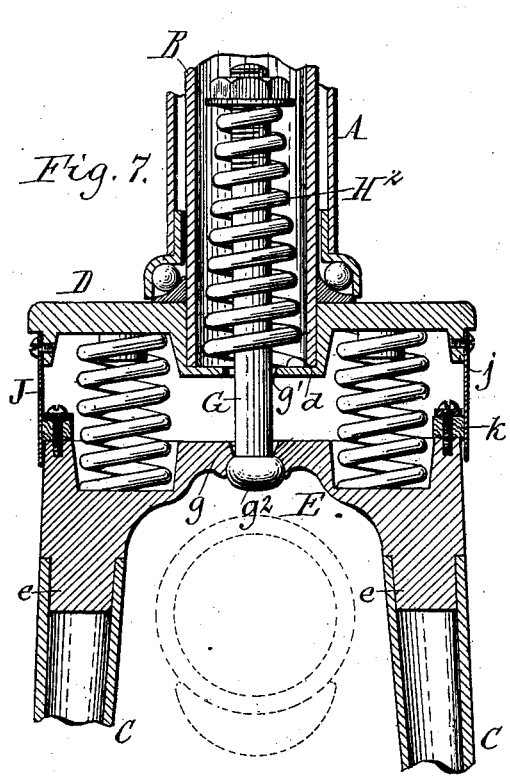
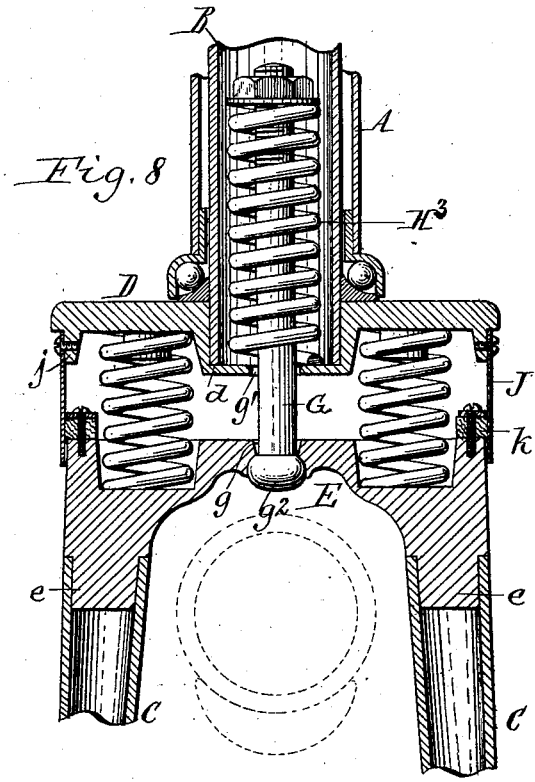

UNITED STATES PATENT OFFICE.

NORMAN B. ZIMMERMAN, OF NORTH TONAWANDA, NEW YORK.

CUSHIONED BICYCLE-FRAME.

SPECIFICATION forming part of Letters Patent No. 703,632, dated July 1, 1902.

Application filed December 14, 1901. Serial No. 85,987. (No model.)

*To all whom it may concern:*

Be it known that I, NORMAN B. ZIMMERMAN, a citizen of the United States, residing at North Tonawanda, in the county of Niagara and State of New York, have invented new and useful Improvements in Cushioned Bicycle-Frames, of which the following is a specification.

This invention relates to bicycles and other velocipedes in which a spring-cushion is interposed between the front fork and its stem or steering-spindle for permitting the fork to yield when the wheel strikes obstructions, relieving the rider from the resulting jars and vibrations and preventing undue straining or breakage of the fork.

The object of my invention is to provide a cushioned connection between the fork and its stem which while possessing the necessary stiffness to sustain the rider's weight is at the same time neat, light, and compact in construction and practically dust-proof.

In the accompanying drawings, consisting of two sheets, Figure 1 is a fragmentary front elevation of the front fork and the steering-head of a bicycle embodying my invention. Fig. 2 is a side elevation thereof. Fig. 3 is a longitudinal section of the parts in line 3 3, Fig. 2. Fig. 4 is a vertical central section at right angles to Fig. 3. Fig. 5 is a detached bottom plan view of the upper leaf of the hinge connection. Fig. 6 is a detached top plan view of the lower leaf of said connection. Fig. 7 is a longitudinal section similar to Fig. 3, showing a modified construction of the cushioning-spring within the fork-stem. Fig. 8 is a similar section of another modification.

Like letters of reference refer to like parts in the several figures.

A indicates the usual steering-head of the bicycle, and B the stem or steering-spindle of the front fork, suitably journaled in the head. This stem is made separate from the tubular fork sides C and pivotally connected therewith by a hinge-like connection comprising upper and lower plates or leaves D E, secured, respectively, to the lower end of the stem and the upper ends of the fork sides and hinged together on the rear side of the fork by a horizontal pintle $f$. As shown in Figs. 3 and 4, the upper leaf of this hinge is provided with a central socket $d$, in which the fork-stem B is brazed or otherwise secured, while the lower leaf has lugs $e$, which enter the upper ends of the fork-tubes and are brazed therein, these lugs being preferably shouldered to form flush joints, as shown. As shown in Figs. 2 and 4, the upper hinge-leaf D is provided at its rear end with a depending flange $d'$, which covers the rear side of the hinge-knuckles.

Referring to the construction shown in Figs. 1 to 4, G indicates a tie-bolt which connects the leaves D E of the hinge connection on the front side of the pintle $f$ and which passes loosely through openings $g$ $g'$, formed centrally in the lower leaf and in the bottom of the socket $d$ of the upper leaf and extends into the fork-stem B. The head $g^2$ of this bolt rests against a concave seat in the under side of the lower leaf E, and the openings through which it passes are flared or made large enough to permit the necessary swiveling action of the bolt. To the portion of this bolt arranged within the fork-stem B a cushioning and return spring is applied, consisting, preferably, of coils or sections H H' of differential resistance. In the construction shown in Figs. 1 4 two independent springs of uniform diameter are mounted on the tie-bolt, the lower one of which is comparatively short and stiff and rests upon the bottom of the socket $d$, while the upper one is somewhat lighter, so as to yield in advance of the heavy spring. These springs are separated by a washer $h$, which loosely surrounds the tie-bolt, and a similar washer may be interposed between the upper spring and the nut of the bolt.

I I indicate main cushioning-springs arranged between the front portions of the hinge-leaves D E and located on opposite sides of the tie-bolt G. These springs are sufficiently heavy to prevent their complete collapse under the rider's weight, and yet so light as to ease and absorb any ordinary shocks or jars received by the front wheel. The upper ends of these springs may be held in position by studs $i$, projecting from the under side of the upper leaf D into the springs, while their lower ends are preferably seated in sockets $i'$, formed in the lower leaf E and depressed some distance below the surface thereof. By depressing these sockets longer and more resilient springs may be employed without increasing the distance between the hinge-leaves. For the same reason the socket $d$ of the upper leaf D is depressed below the bottom of the leaf, as shown.

The main cushioning-springs I and the gap between the hinge-leaves D E may be inclosed by a depending dust guard or shield J, carried by the upper leaf and overlapping the edge of the lower leaf. This shield extends around the front and the sides of the leaves, and in the construction shown in the drawings the shield is fastened to a depending flange $j$ of the upper leaf by screws. The upper edge of the shield follows the contour of the overhanging edge of the upper leaf, and its rear portions cover the ends of the pintle $f$. By this construction the shield not only conceals the pintle and forms a neat finish for the fork-crown, but it also prevents displacement and loss of the pintle and excludes rain, dust, &c., therefrom, preventing rusting and binding of the hinge.

When the rider is mounted on the bicycle, the main springs I are compressed more or less, forming a cushion which absorbs vibrations and ordinary jars. As the tie-bolt G and the return-springs H H' are carried by the upper leaf D of the hinge connection the bolt would ordinarily be so loose as to slide downward through the opening in the lower leaf and rattle. To prevent this, the nut of the tie-bolt is screwed down sufficiently to place the light upper spring H normally under partial compression. The result is that although this partly-compressed spring is slackened by the descent of the upper hinge-leaf due to the rider's weight when the wheel is occupied, it still holds the bolt up in its normal position and prevents rattling of the same. When the front wheel runs over a small obstruction, as a stone, which causes the fork to be deflected upwardly and forwardly, the lower hinge-leaf approaches the upper leaf and the compressed light spring H by its extension draws the head of the tie-bolt against its seat and avoids rattling. In case the machine encounters an obstruction which deflects the front fork rearwardly out of its normal position the lower hinge-leaf E swings farther away from the upper leaf, drawing the tie-bolt with it and causing the upper or light spring H of the bolt to be compressed, thereby easing the shock. The lower spring H' is made so stiff that such a shock if of ordinary force will cause compression of the light spring between the lower heavy spring and the stop formed by the nut of the tie-bolt, the heavy spring thus acting practically as a rigid abutment for the light spring under an ordinary shock. If, however, the fork receives an extraordinary shock—for instance, by a collision or by the front wheel running violently against a curb—the resistance of the light spring will be overcome and the heavy lower spring will come into action and resist and ease the shock.

The light spring thus relieves the rider and protects the front fork against breakage from ordinary shocks, while the heavy spring acts as a more powerful reserve cushion which comes into action when the shock is so violent as to overpower the light spring.

The lower edge of the dust-shield J is sufficiently separated from the edge of the lower hinge-leaf E to give the fork the necessary freedom of movement and avoid injury to the shield. To form a tight joint at this point, a packing $k$, of felt or other suitable material, may be secured to the margin of the lower hinge-leaf in such manner as to bear against the inner side of the shield, as shown in the drawings.

By employing two cushioning-springs I between the hinge-leaves located on opposite sides of the tie-bolt G a main cushion is obtained which possesses sufficient stiffness to bear the rider's weight and which is at the same time comparatively light in weight and compact in arrangement.

I do not wish to be limited to the use of independent springs of differential tension or resistance, inasmuch as the same effect may otherwise be obtained. For instance, as shown in Fig. 7, a single spiral spring $H^2$, constructed of wire of uniform thickness, but tapered toward its upper end, may be employed. By this construction the convolutions gradually increase in diameter toward the base of the spring. In this case the upper convolutions are stiffer than the lower ones, and the lower convolutions therefore yield and collapse in advance of the upper ones when the fork is deflected rearwardly. The upper and lower portions of the spring thus have a differential and successive action similar to the construction first described, but in the reverse direction.

As a further modification of my improvement a single return-spring $H^3$, of cylindrical form, having no differential action, may be employed in connection with the two main cushioning-springs on opposite sides of the tie-bolt, as shown in Fig. 8.

I claim as my invention—

1. The combination of a wheel-fork and a hollow stem, each carrying a hinge leaf or plate, a pintle connecting said leaves on the rear side of the fork, a tie-bolt passing centrally through said leaves on the front side of said pintle and extending into the stem, a cushioning and return spring applied to said bolt within the stem, and main cushioning-springs arranged between said hinge-leaves on opposite sides of said tie-bolt, substantially as set forth.

2. The combination of a wheel-fork provided at its crown with a hinge leaf or plate, a hollow stem having a corresponding hinge-leaf provided centrally with a socket which is depressed below the under side thereof, a pintle connecting said hinge-leaves on the rear side of the fork, a tie-bolt loosely connecting said leaves on the front side of said pintle and extending into said hollow stem, a main cushioning-spring interposed between said hinge-leaves, and a cushioning and return spring applied to said tie-bolt within the stem and resting upon the bottom of said depressed socket, substantially as set forth.

3. The combination of a hollow stem provided with a hinge leaf or plate, a fork having at its crown a corresponding hinge-leaf provided with sockets which are located on opposite sides of its center and depressed below its upper surface, main cushioning-springs interposed between said hinge-leaves and having their lower ends seated in said sockets, a tie-bolt loosely connecting said hinge-leaves and extending into said hollow stem, and a cushioning and return spring applied to said bolt, substantially as set forth.

4. The combination of a wheel-fork and a stem each carrying a hinge leaf or plate, a pintle connecting said leaves, a main cushion interposed between said leaves, and a return-cushion arranged to act upon said hinge-leaves and having sections of differential tension constructed to come into action successively, substantially as set forth.

5. The combination of a wheel-fork and a stem each carrying a hinge leaf or plate, a pintle connecting said leaves, a main cushion interposed between said leaves, a tie-bolt loosely connecting said hinge-leaves and extending into said stem and provided within the stem with a stop, and heavy and light return-springs applied one above the other to the tie-bolt, the lower return-spring resting upon an abutment at the lower end of the stem and the stop of the tie-bolt bearing against the top of the upper return-spring, substantially as set forth.

6. The combination of a wheel-fork and a stem, each carrying a hinge leaf or plate, a pintle connecting said leaves, a cushioning-spring interposed between the leaves, and a dust-shield depending from the hinge-leaf of the stem and overlapping the leaf of the fork, substantially as set forth.

7. The combination of a wheel-fork and a stem, each carrying a hinge leaf or plate, a pintle connecting said leaves, a cushioning-spring interposed between the leaves, and a dust-shield depending from the leaf of the stem and overlapping the edge of the fork-leaf, and extending around the front and sides of said leaves and over the ends of said pintle, substantially as set forth.

Witness my hand this 7th day of December, 1901.

NORMAN B. ZIMMERMAN.

Witnesses:
CARL F. GEYER,
EMMA M. GRAHAM.